United States Patent [19]
Baird

[11] 3,891,495
[45] June 24, 1975

[54] METHOD AND APPARATUS FOR RECOVERING POWDERS FROM LIQUIDS

[75] Inventor: James L. Baird, Winchester, Mass.

[73] Assignee: Artisan Industries Inc., Waltham, Mass.

[22] Filed: Apr. 15, 1974

[21] Appl. No.: 461,163

Related U.S. Application Data

[63] Continuation-in-part of Ser. No. 255,536, May 22, 1972, abandoned.

[52] U.S. Cl............... 159/6 WH; 159/49; 202/236; 203/89
[51] Int. Cl........ B01d 3/08; B01d 3/00; B01d 1/22
[58] Field of Search................ 159/6 W, 49, 6 WH; 202/236; 203/89

[56] References Cited
UNITED STATES PATENTS

| | | | |
|---|---|---|---|
| 2,848,388 | 8/1958 | Bueche | 159/6 W |
| 3,357,477 | 12/1967 | Monty | 159/6 WH |
| 3,464,478 | 9/1969 | Tomoharuueda et al. | 159/6 WH |
| 3,521,691 | 7/1970 | Donovan | 159/6 WH |

FOREIGN PATENTS OR APPLICATIONS

| | | | |
|---|---|---|---|
| 1,554,189 | 12/1968 | France | 159/6 WH |

*Primary Examiner*—Jack Sofer
*Attorney, Agent, or Firm*—Richard P. Crowley

[57] ABSTRACT

A method and apparatus for recovering powders from liquids employing a rotary thin-film-type generally horizontally axised evaporator, wherein the liquid material processed moves in a generally opposite direction to the vapor from the liquid material, the thin-film apparatus containing a plurality of rotor blades secured to a rotor shaft, the blades so pitched from one to the other end so as to form at least four zones: a first zone to force the liquid feed material toward the product outlet; a second zone to evaporate the liquid and form a slurry or powder; a third zone to direct the powder toward the discharge; and a fourth zone to feed back bypass powder toward the product outlet, said zones formed by pitching the rotor blades at a desired angle.

17 Claims, 6 Drawing Figures

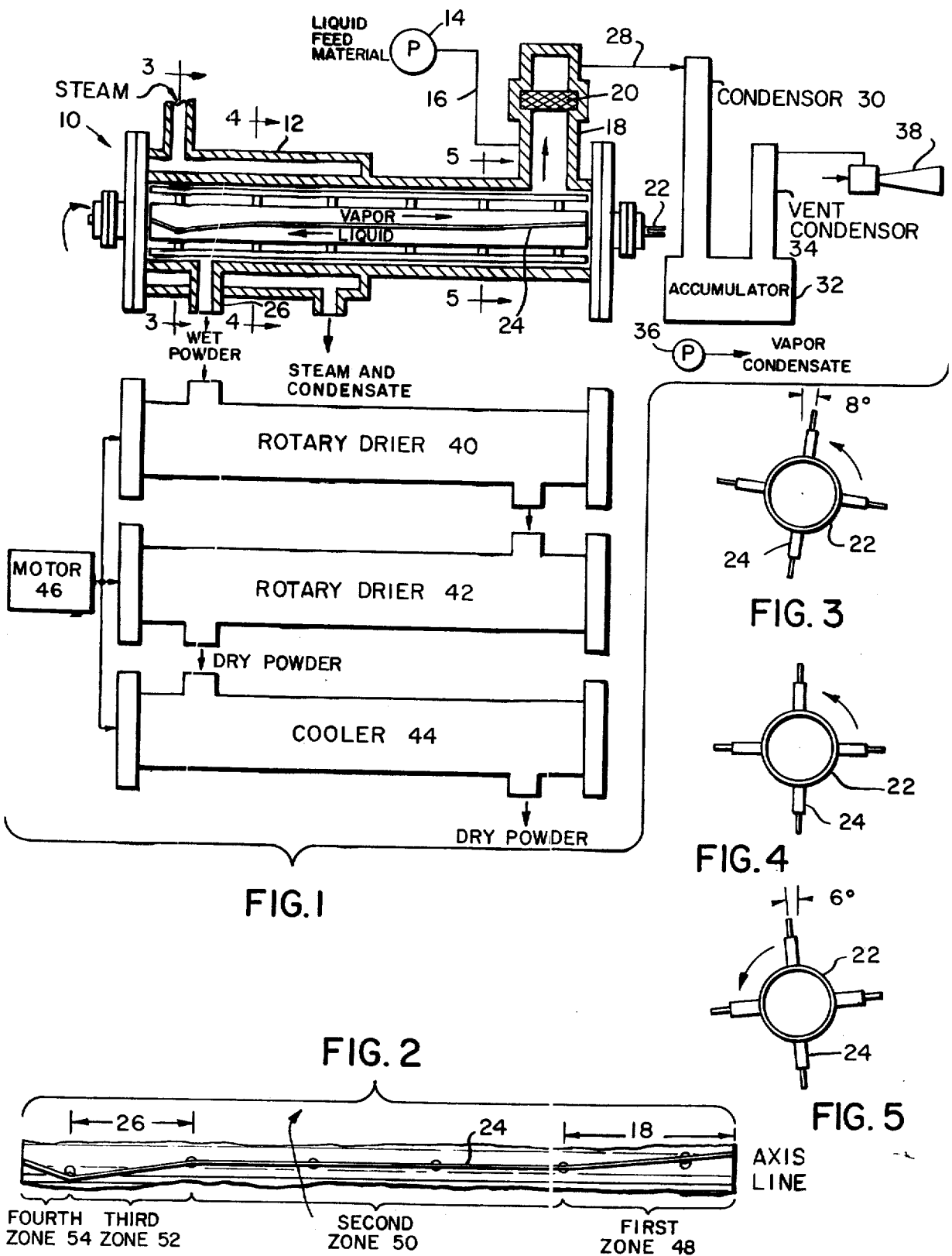

METHOD AND APPARATUS FOR RECOVERING POWDERS FROM LIQUIDS

REFERENCE TO PRIOR APPLICATION

This application is a continuation-in-part of U.S. Ser. No. 255,536 filed May 22, 1972 now abandoned.

BACKGROUND OF THE INVENTION

Thin-film evaporators are often employed to process liquid material into a powdered or wet-slurry form through placing a thin film of the liquid material on the inner wall of a closed processing chamber to provide a surface for evaporation, and, thereafter, evaporating the thin film to form a vapor stream which may be subsequently condensed, and the concentrated liquid or power discharged. The liquid feed material may comprise a liquid solution, emulsion, slurry, suspension or a mixture thereof, such as, for example, a water solution of salts, solution of polymers or a resin emulsion or the like. A number of difficulties are ofter associated with the processing of a liquid feed material to a powder or crystalline or even very wet-slurry form due to the transitional nature of the process within the thin-film evaporator; that is, from a liquid feed material, then to a concentrated liquid, then to a paste sludge and finally a particular crystal or powdered form. In the processing of monomer, polymer and resin-like liquid feed mixtures wherein the material to be recovered is in a paste-type viscosity form, viscous material has been removed from the product outlet in its viscous paste form, typically through an auger screw or positive displacement pumps positioned directly adjacent the product outlet (see U.S. Pat. Nos. 3,554,263; 3,554,266; and 3,357,478).

Where the liquid material is to be processed into an essentially dry form; that is, a powder or a crystal form (which term includes discreet particulate material which may be crystalline or amorphous), additional processing difficulties are encountered when exploying a rotary thin-film generally horizontally axised evaporator due to the entrainment of the powder material in the vapor stream in the evaporator. Where the vapor flow in an evaporator is concurrent with the liquid feed material, it may aid in the removal of the powdered material from the evaporator. However, the vapor stream often entrains the powder material, so that a cyclone or centrifuge separator, bag filter, electrostatic precipitator, or other apparatus separating powder from vapor streams must be employed adjacent the product vapor outlet. The employment of such equipment increases the equipment cost, while additionally, the equipment often must be jacketed so that the stream is kept adiabatic to reduce condensation on the wall surfaces. The employment of thin-film evaporators in a concurrent processing system in shown in U.S. Pat. No. 3,587,704. The invention described and claimed in the present application is an improvement to the system described in such patent.

Further, rotary thin-film-type evaporators have been employed in processing liquids wherein the rotor blade has been twisted or formed into various shapes to control the residence time and/or the flow of the fluid material processed through the evaporator. A thin-film evaporator employing a helical blade where the end portions of the rotor blade are twisted is shown in U.S. Pat. No. 3,357,477.

SUMMARY OF THE INVENTION

My invention concerns a method and apparatus for the drying of a liquid to a powder state in a continuous operation which provides powder of uniform consistency, and which overcomes many of the problems of the prior art devices. In particular, my invention comprises a method and apparatus which minimizes and substantially reduces, during the processing operation, the entrainment of the powder product in the vapor stream, thus, often avoiding the extra expense of auxiliary equipment formerly required. More particularly, my invention provides a method and apparatus for recovering a powder from a liquid feed material in a generally horizontally axised thin-film evaporator wherein the flow of the vapor stream created by the evaporation of the liquid is generally opposite to that of the processing of the liquid feed material into the powder; i.e., countercurrent, and wherein the rotor blades of the evaporator are so shaped so as to aid in the processing of the liquid feed material; e.g., pitched, and to avoid powder entrainment in the countercurrent vapor stream.

My invention comprises a horizontally axised thin-film evaporator, which evaporator includes a plurality of rotor blades, the rotor blades so shaped and pitched from one to the other end of the evaporator to form at least four distinct zones. My evaporators are countercurrent evaporators in the preferred embodiment, although thin-film evaporators of the concurrent type may be employed with my pitched rotor blades, although the full advantages of minimizing powder entrainment may not be achieved with the concurrent evaporator.

I have found that by pitching various portions of the rotor blades of a thin-film evaporator used in the processing of liquid material to a powder form, particularly in a countercurrent evaporator, entrainment of the powder in the vapor stream is prevented and minimized. Typically, all the blades are so pitched or pitched in an even balanced manner. In my evaporator, generally there is an outlet for the product powder and generally one inlet for the introduction of liquid feed material and usually the same inlet being used for the removal of the vapor stream. A first zone is formed within the processing chamber by pitching the rotor blades at and about the area of the liquid feed inlet and generally adjacent the inlet, slighly away from the direction of rotation so as to direct liquid feed material with a directional force component toward the other or product-outlet end of the evaporator.

A second heating and processing zone is formed by employing a typical straight rotor blade coplnar with the axis of rotation. The straight-edge rotor blade forms a heating and processing zone wherein the liquid feed material is substantjally evaporated, and the vapor stream formed, while from one to the other end of the processing zone, the thin-film material progressively is increased in concentration toward the product outlet, and processed into a wet-powder, slurry or dry-powder form.

A third zone is formed by pitching the rotor blades at a slight angle in the same direction as the pitch angle in the first zone in order to direct the powder material formed toward the product outlet. Typically, the third zone is formed slightly before the product outlet and ends at or slightly beyond the product outlet.

The fourth zone is formed by pitching the rotor blades in the opposite direction from that of the blades in the third zone, so as to feed back into the third zone any powder which bypasses the product outlet and which might form at the very end of the evaporator. Typically, the product outlet is not flush with the evaporator end, but rather spaced upstream therefrom. The combination of my zones obtained by pitching the straight-edge rotor blade of a thin-film evaporator as illustrated provides for the efficient discharge of a powder of uniform consistency. The pitched blades, particularly in combination with the countercurrent flow of the vapor, minimizes and prevents entrainment of the powder in the vapor stream.

DESCRIPTION OF THE DRAWINGS

FIG. 1 is a schematic illustration of a system including a thin-film evaporator for processing liquid feed material into a dry powder.

FIG. 2 is a more detailed plan view of one pitched rotor blade of my thin-film process as shown in FIG. 1.

FIGS. 3, 4 and 5 are enlarged cross-sectional views along lines 3—3, 4—4 and 5—5 of the rotor shown in the thin-film evaporator in FIG. 1.

DESCRIPTION OF THE INVENTION

Figure 6:
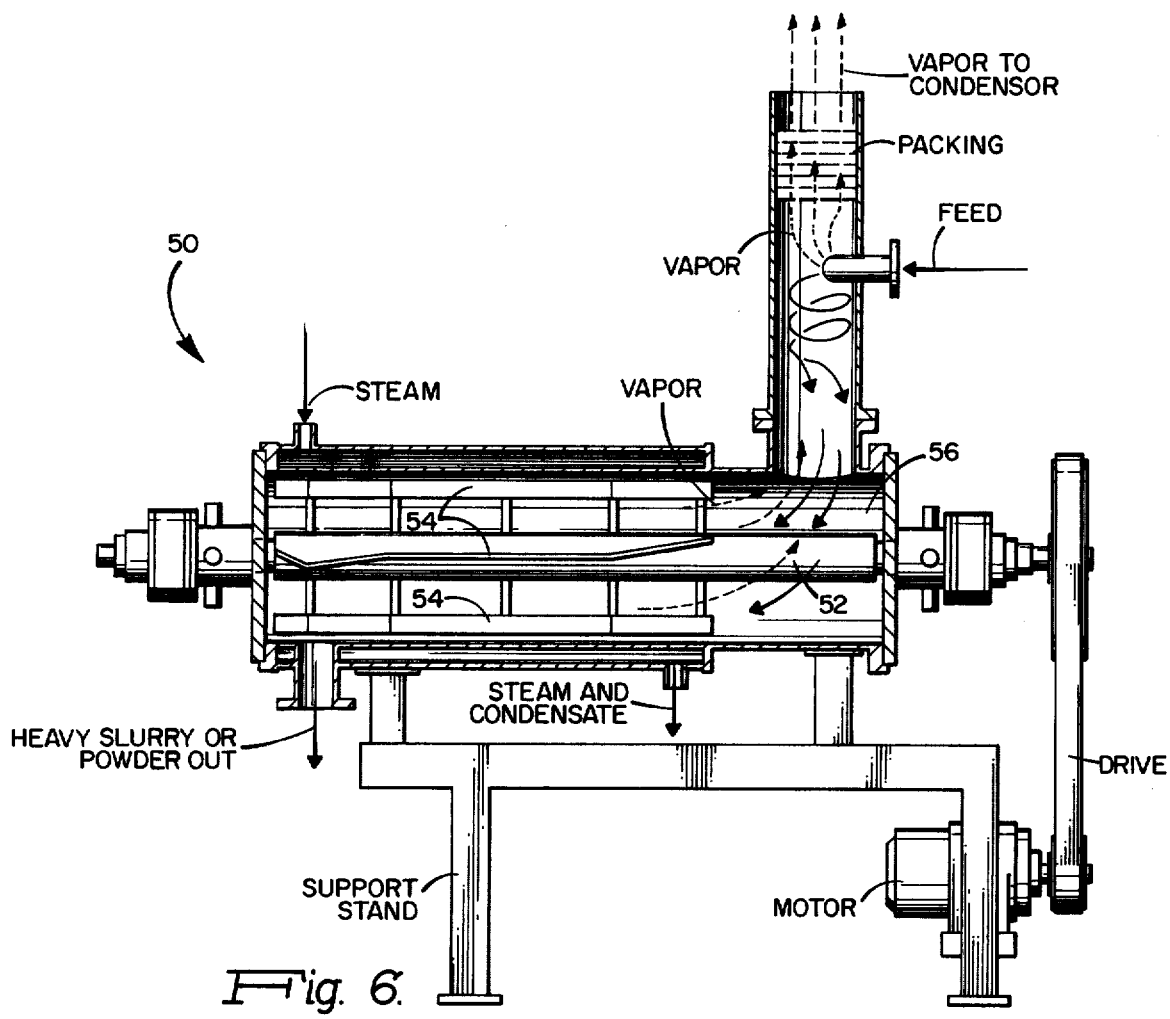
FIG. 6 is a schematic illustration of another embodiment of my thin-film evaporator.

For the purposes of illustration only, my invention will be described, both in method and apparatus, on and in connection with the processing of a sodium methylate-methanol liquid feed into a methanol condensate and a dry sodium methylate powder. FIG. 1 illustrates a processing system which includes a horizontally axised cylindrical-type thin-film evaporator 10 which comprises a closed cylindrical chamber having interior walls and surrounded by all or a part of its length by a temperature-control jacket 12 which is adapted for the introduction of a heating or cooling heat-exchange fluid, such as steam, with steam and condensate removed at the opposite end. The evaporator includes a plurality of rotor blades 24 secured to a central rotor 22, with the rotor blades shown pitched as will hereafter be described.

The blades which extend radially outwardly from the rotor often may comprise from two to eight rotor blades; e.g., four as shown, the blade tips extending into a small, but generally uniform, closely spaced relationship with respect to the interior walls of the chamber of the evaporator. The rotor blades on rotation provide a thin agitated turbulent film of the liquid feed material on the interior wall of the chamber. An inlet pump 14 is connected through feed inlet line 16 into the inlet 18, which inlet includes an entrainment separator 20. The inlet 18 for the liquid feed material also serves in this illustration as the outlet for the vapor removed from the processing chamber. The evaporator 10 has a product outlet 26 from which the powder product or slurry is removed. Typically, the product outlet is not flush with the back end of the evaporator, but rather spaced apart from the back end as shown. A vapor outlet line 28 from the evaporator connects through a condenser 30 to condense the vapor and hence to an accumulator 32 and a vent condenser 34. A pump 36 serves to recover, reuse or discard condensate from the accumulator, depending upon the particular liquid feed material being processed. A jet eductor 38, such as a steam eductor, is connected through the vent condenser so as to provide a vacuum for the thin-film evaporator system. Thin-film rotary dryers 40 and 42 are shown in series communicating with the product outlet 26. A rotary cooler 44 is also connected to dryer 42. The rotors of the dryer and cooler are driven by a motor 46.

The rotor blades employed on my thin-film evaporator are shown in more detail in FIGS. 2–5, the rotor blades defined by the various pitches of the blade zones 48, 50, 52 and 54. In addition, my system may include any additional auxiliary equipment, such as steam ejectors, vacuum pumps, condensers, cyclone separators, additional or a different type of dryers and like equipment, as well as flow, temperature and pressure, controlling and recording equipment.

In operation, the liquid feed material comprising, for example, 20 to 30 percent solution of sodium methylate in methanol is pumped by pump 14 through line 16 into inlet 18, with the thin-film evaporator being under subatmospheric pressure of about 50 to 100 mm through the jet eductor 38. The entrainment separator 20 on any flashing of the liquid feed material entrains liquid particles in the flashed vapor, while the entrainment separator also prevents entrainment of liquid in the vapor stream being removed from the evaporator. The liquid feed stream is often introduced tangentially in order to reduce entrainment of the liquid in the vapor stream. The rotation of the rotor blades 24 at high speed forms an agitated thin-film of the liquid feed material against the interior wall of the chamber. The steam is introduced into the control jacket to provide a temperature of 300° to 400°F to effect evaporation of the methanol from the liquid feed material. While being processed through the thin-film evaporator, the liquid feed material will change from a liquid at the inlet 18 to a powder at the outlet 26 going through a slurry form.

On introduction, the liquid feed material is directed by the pitch of the rotor blade 24 in the first zone 48 toward the product outlet end 26 of the thin-film evaporator. The rotor blade is pitched forward at an angle of approximately 1° to 15°; for example, 4° to 10°, from the axis of the rotor 22, and in the direction away from the rotation of the rotor in order to impart a vector force component toward the product outlet. The first zone generally extends across the inlet 18 and generally terminates at or just beyond the inlet opening. The liquid feed material placed in a thin film on the interior wall is then processed through a processing zone 50 wherein the rotor blade 24 is characterized by a typical straightedge blade aligned with the rotor axis to provide a thin film which progressively increases in concentration to a slurry or powder form prior to the third zone 52.

In the third zone 52, the rotor blade 24 is pitched at a slight angle from the rotor axis of from 1° to 15°: for example, 4° to 10°, but similarly as the pitch in the inlet zone, so as to direct the wet slurry or just formed powder toward the product outlet 26. The third zone would generally start just before the product outlet and end just after the product outlet. The pitch of the rotor blade directs the material toward the product outlet 26. To prevent powder, which bypasses the product outlet 26, from accumulating at the adjacent end of the thin-film evaporator and being picked up by the vapor stream, the rotor blade 24 is then pitched in an opposite direction to that of the blade in the third zone, and, typically, of about the same pitch angle, to form a zone 54 which feeds any bypass powder material back into the third zone so that it may be again directed toward the product outlet 26. By such pitch of the rotor blades, powder material is prevented from being entrained in the countercurrent vapor stream, while, further, such pitch of the rotor blade provides for the efficient processing of the feed and powder.

The extent of the pitch as regards pitch angle and the length of each zone; i.e., blade length, will vary, depending upon the material being processed and the results desired. However, I have found that my combination of pitch angles to create such zones, particularly in a countercurrent thin-film evaporator, overcomes many of the problems associated with powder entrainment and the efficient removal of powder of the prior art. The pitching of the blade has been shown in four distinct straight-edge pitches rather than in curved form, since the forming of a straight-edge blade is less expensive than curving the blade to any particular taper. The first zone may comprise from 1 to 20 percent; for example, 5 to 10 percent, of the blade length which the other zones may vary in order as follows: the second zone from 30 to 70 percent; for example, 40 to 60%, the third zone from 5 to 25 percent, for example, 10 to 15 percent; and the fourth zone from 1 to 10 percent, for example, 2 to 8 percent. It should be noted that although the blade is pitched, the blades in each zone provide an agitated turbulent film on the interior walls of the chamber, so that in effect, processing occurs as before throughout the entire length of the evaporator chamber. FIGS. 3, 4 and 5 illustrate in an enlarged cross-sectional view four radial rotor blades 24 with pitch blade angles which are particularly useful in the processing of a 25 percent sodium methoxide-methanol solution to a 70 percent powder form e.g. 6° for the first zone and 8° for the third zone.

In operation, the methanol solvent vapor stream moves generally opposite to the liquid feed material being processed, the vapor stream moving out the inlet 18, the entrainment separator 20 removing liquid particles entrained therein, through vapor line 28 to condenser 30 which condenses the methanol, the condensate being recovered in the accumulator 32 wherein it is recovered through pump 36 for storage or for reuse. The vent condenser 34 is used to recover vapor which has bypassed condenser 30.

The powder material produced varies in degrees of dryness with the particular material and operating conditions employed. For example, sodium methylate is generally processed containing residual methanol, although it feels, looks and acts as a dry powder. The type and nature of the powder formed depends upon the retention time in the thin-film evaporator, as well as the nature of the material, since often the powder will contain solvents, because of the way it is formed against the wall of the evaporator. Thus, the powder material to be removed may be dry powder (98 percent dry) or may be powder containing residual solvents (e.g., 5-20 percent), which should be further dried to a desired level by diffusional processes which are inherently slow. Often the moisture or solvent must be removed from the interior of the granular particles as formed in the thin-film evaporator. Therefore, optionally, but particularly with sodium methylate, or other alkali, alkali earth or alkoxide, additional dryers, such as rotary dryers 40 and 42 or further dryers in series, are employed. The rotary dryer is preferred, particularly a ribbon or ribbon-like rotary dryer blade to dry the powder discharged from the product outlet 26 to the desired degree of dryness, with the dry powder then cooled in cooler 44 to 80° to 100°F and discharged and recovered.

My method has been illustrated employing a cylindrical thin-film evaporator 10; however, it is recognized that my invention may be employed with tapered thin-film evaporators, such as those described in U.S. Pat. No. 2,927,634 or similar equipment. Furthermore, my invention has been described in connection with the recovering of an alkali alkoxide sodium mehtoxide from a methanol solution; however, my method and apparatus may also be usefully employed in recovering a wide variety of alkali, alkali earth, alkoxide from an oxgen-containing organic solvent, such as aldehydes, ketones and alcohols, such as lower chain $C_2-C_5$ alcohols like methanol, propanol and the like, and wherein the metal may be potassium, cesium, sodium and the like. In the operation described, the methanol vapor stream being a valuable by-product is recovered through condenser 30 and then condenser 34; however, my method and apparatus may be also usefully employed to recovering salts from aqueous liquid feed materials wherein the additional drying and condensing equipment is no longer required, but merely the thin-film evaporator with my blades as described and employed.

FIG. 6 is a schematic illustration of a modified thin-film evaporator of my invention having pitched rotor blades as illustrated more particularly in FIGS. 1-5. In this modified countercurrent-type evaporator 50, the horizontally axised rotor 52 with skewed rotor blades 54 secured thereto extends through a vapor chamber 56 into which the liquid feed material is introduced. In the modified evaporator illustrated, the liquid feed material flows from the chamber 56 in a generally axial direction into the first zone where the skewed rotor blades 54 propel the liquid feed material toward the product outlet. If desired, the axis of the evaporator 50 may be tilted slightly to induce the flow of liquid feed material in the chamber 56 toward the first zone. The modified evaporator 50 overcomes any problems associated with the rotor blades throwing liquid feed material back up into the inlet where the feed is introduced perpendicularly and directly into the first zone as in FIG. 1.

As illustrated, the liquid feed material is typically introduced into the evaporator processing chamber generally perpendicular to the axis of the rotor blade, either directly into the area of the first zone (FIG. 1) or into a liquid-vapor chamber in the processing chamber (FIG. 5) directly adjacent the first zone and usually an extension of the processing chamber at the end of the apparatus.

In the preferred embodiment, the liquid feed is introduced into the processing chamber by a common vapor-feed inlet (single or multiple, depending on the feed stream), so that a liquid is introduced and the counter current vapor stream is removed through the same duct as the vapor. However, if desired, the feed and vapor streams may be respectively introduced through or removed from one or more separate inlets and outlets.

The evaporator of FIG. 6 is profitably employed in the processing aqueous waste stream to obtain a heavy slurry or wet powder product. For example, the liquid feed material employed may be an aqueous plating waste stream or a circuit board waste stream derived from the water-rinsing of circuit boards. In particular, the evaporator 50 may be employed in combination with one or more high-pressure reverse osmosis units. For example, in the processing of aqueous plating waste streams containing from about 10 to 1000 ppm of low molecular salts, reverse osmosis unit is used to concentrate the waste stream for recovery of the salts or to make disposal easier. Typically, the reverse osmosis unit only concentrates the salts to 1 or 2 percent and sometimes as high as 8 percent, but higher concentration levels are not possible by reverse osmosis. The concentrated aqueous stream from the reverse osmosis unit is then introduced as the liquid feed stream into evaporator 50, while the plating waste or other salts are recovered from the product outlet in a heavy slurry or a wet powder.

My method and apparatus may be usefully employed in recovering salts from aqueous solutions, slurries, emulsion, dispersions and the like; for example, in the recovering of salts, such as silver or other metal halides and ammonium sulfate salts from photographic waste solutions, as well as recovering sodium chloride from brine solutions from the backwash of deionizing units; and recovering sodium sulfate and sodium chloride from ion-exchange regeneration solutions, as well as recovering salts from radioactive waste solutions, such as sodium nitrate and the like. In such operations, the water vapor stream is merely discharged, while the salt or powder product is desired to be recovered without any particular degree of dryness required. Often, the purpose of said processing is merely to prevent pollution of the waterways from the discharge of the salt solution. Of course, where the salts or the vapor have a commercial value, such as, for example, the recovering of powdered resins for reuse or blending with a resin, the material or vapor should be recovered.

What I claim is:

1. A thin-film evaporator, which evaporator comprises in combination:
   a. a closed substantially horizontally axised steam-jacketed chamber characterized by an interior wall defining a surface of revolution;
   b. a rotor shaft centrally positioned within the chamber;
   c. means to rotate the rotor shaft;
   d. a feed inlet at the one end of the chamber for the introduction of a liquid feed material into the chamber;
   e. a product outlet at the other end of the chamber for the withdrawal of a slurry or powder material from the chamber;
   f. a vapor outlet at the one end of the chamber for the removal of the vapor from the chamber; and
   g. a plurality of rotor blades secured to the rotor shaft and adapted for rotation therewith, the blades having a one end and another end and coaxially arranged along the rotor shaft and extending into a close, thin-film-forming relationship with the interior wall of the closed chamber, the blades comprising a series of straight-edged sections skewed from the axis of the rotor shaft from one to the other end along the rotor shaft and comprising
   i. first straight-bladed section pitched opposite to the direction of rotation of the rotor blades at a skew angle of about 1° to 15° with the axis of the rotor shaft, and extending from the region of the one end toward the product outlet, the first straight-bladed section adapted to impart a vector component to the liquid feed material introduced into the closed chamber toward the product outlet;
   ii. a second straight-bladed section aligned and coplanar with the axis of the rotor shaft;
   iii. a third straight-bladed section pitched at an angle opposite to the direction of rotation and at a skew angle from about 1° to 15° with the axis of the rotor shaft, and extending from just upstream of the product outlet to across and just downstream of the product outlet and adapted to impart a vector component to the material in the closed chamber toward the product outlet; and
   iv. a fourth straight-bladed section pitched in the direction of rotation and opposite to the pitch of the third-bladed section, and having a skew angle from about 1° to 15° with the axis of the rotor shaft, and extending from the end of the third section to the end of the rotor at the other end, and adapted to impart a vector component to the material toward the product outlet.

2. The apparatus of claim 1 wherein the first, third and fourth straight-bladed sections are pitched at a skew angle of from about 4° to 10° from the axis of the rotor shaft.

3. The apparatus of claim 1 wherein the first straight-bladed section comprises from about 1 to 20 percent of the blade length, the second bladed section comprises from about 30 to 70 percent of the blade length, the third bladed section comprises from about 5 to 25 percent of the blade length, and the fourth bladed section comprises from about 1 to 10 percent of the blade length.

4. The apparatus of claim 1 wherein the vapor outlet and the liquid feed inlet are the same.

5. The apparatus of claim 1 wherein the apparatus includes a vapoor chamber within the closed chamber and adjacent the one end of the rotor blades.

6. The apparatus of claim 1 wherein the feed inlet and vapor outlet are the same and comprise a vertically extending column containing a packed section therein, a feed inlet disposed beneath the packed section and a vapor outlet above the packed section, and means to remove the vapor from the outlet.

7. A fluid-processing apparatus, which apparatus comprises the evaporator of claim 1, and includes in combination:
   a. means to provide a subatmospheric pressure within the evaporator;
   b. means to condense the vapor discharged from the vapor outlet of the evaporator; and
   c. means to dry the powder discharged from the product outlet of the evaporator.

8. The apparatus of claim 1 wherein the first straight-bladed section extends from the one end and across the liquid feed inlet and just downstream of the inlet.

9. The apparatus of claim 8 wherein the feed inlet is positioned to feed the liquid feed material into the vapor chamber, the liquid feed material flowing from the vapor liquid chamber radially into the first section.

10. The apparatus of claim 8 wherein the feed inlet and the vapor outlet are the same, the feed inlet and vapor outlet positioned to feed liquid material into the vapor chamber and to remove vapor therefrom.

11. In a method for processing a liquid feed material into a concentrated slurry or powder material in an apparatus which comprises: a closed substantially horizontally axised chamber characterized by an interior wall defining a surface of revolution; a rotor shaft centrally positioned within the chamber; means to rotate the rotor shaft; a feed inlet at the one end of the chamber for the introduction of a liquid feed material into the chamber; a product outlet at the other end of the chamber for the withdrawal of a slurry or a powder material from the chamber; a vapor outlet at the one end of the chamber for the removal of the vapor from the chamber; and a plurality of rotor blades secured to the rotor shaft and adapted for rotation therewith, the blades having a one end and another end and coaxially arranged along the rotor shaft and extending into a close, thin-film-forming relationship with the interior wall of the closed chamber, the blades comprising a series of straightedged sections skewed along the axis of the rotor shaft from one to the other end along the rotor shaft and comprising: a first straight-bladed section pitched opposite to the direction of rotation of the rotor blades with the axis of the rotor shaft, and extending from the region of the one end, the first straight-bladed section adapted to impart a vector component to the liquid feed material introduced into the closed chamber toward the product outlet; a second straight-bladed section aligned and coplanar with the axis of the rotor shaft; a third straight-bladed section pitched at an angle opposite to the direction of rotation with the axis of the rotor shaft, and extending from just upstream of the product outlet to across and just downstream of the product outlet and adapted to impart a vector component to the material in the closed chamber toward the product outlet; and a fourth straight-bladed section pitched in the direction of rotation and opposite to the pitch of the third-bladed section, and extending from the end of the third section to the end of the rotor at the other end, and adapted to impart a vector component to the material toward the product outlet, the method comprising:

a. introducing a liquid feed material into the inlet;
b. concentrating the liquid feed material into a slurry or powder material and a vapor while passing the feed material from the one to the other end of the evaporator; and i. imparting a flow vector component to the liquid feed material by the first straight-bladed section toward the product outlet;
ii. imparting an axial flow vector component toward the product outlet by the second straight-bladed section by product removal at the other end while continuing the imparted flow vector component from the first straight-bladed section;
iii. imparting a flow vector component to the material from the second straight-bladed section toward the product outlet by the third straight-bladed section; and
iv. imparting a flow vector component to the wet powder material from the third straight-bladed section back toward the product outlet by the fourth straight-bladed section;

c. removing a concentrated slurry or powder material from the product outlet; and
d. removing a vapor from the one end of the evaporator.

12. The method of claim 11 which includes introducing the liquid feed material into the inlet at the one end and removing the vapor from the same inlet.

13. The method of claim 11, which method includes maintaining the interior of the thin-film evaporator under subatmospheric conditions, and drying the slurry or powder discharged from the product outlet.

14. The method of claim 11 wherein the liquid feed material introduced into the feed inlet comprises a sodium methylate-methanol liquid feed material, wherein a wet powder of a sodium methylate is discharged from the product outlet, and wherein a methanol vapor is removed from the vapor outlet.

15. The method of claim 11 wherein the apparatus includes within the closed chamber a vapor chamber at the one end thereof, and which method includes:
a. introducing the liquid feed material into the vapor chamber; and
b. introducing the liquid feed material from the vapor chamber into the first straight-bladed section.

16. The method of claim 11 which includes introducing the liquid feed material from a feed inlet directly into the first straight-bladed section.

17. The method of claim 15 which includes withdrawing a vapor stream from the feed inlet.

* * * * *